July 19, 1927.
R. E. CURTIS
ATTACHMENT FOR TRACTORS
Original Filed Nov. 17, 1922   3 Sheets-Sheet 1
1,636,628
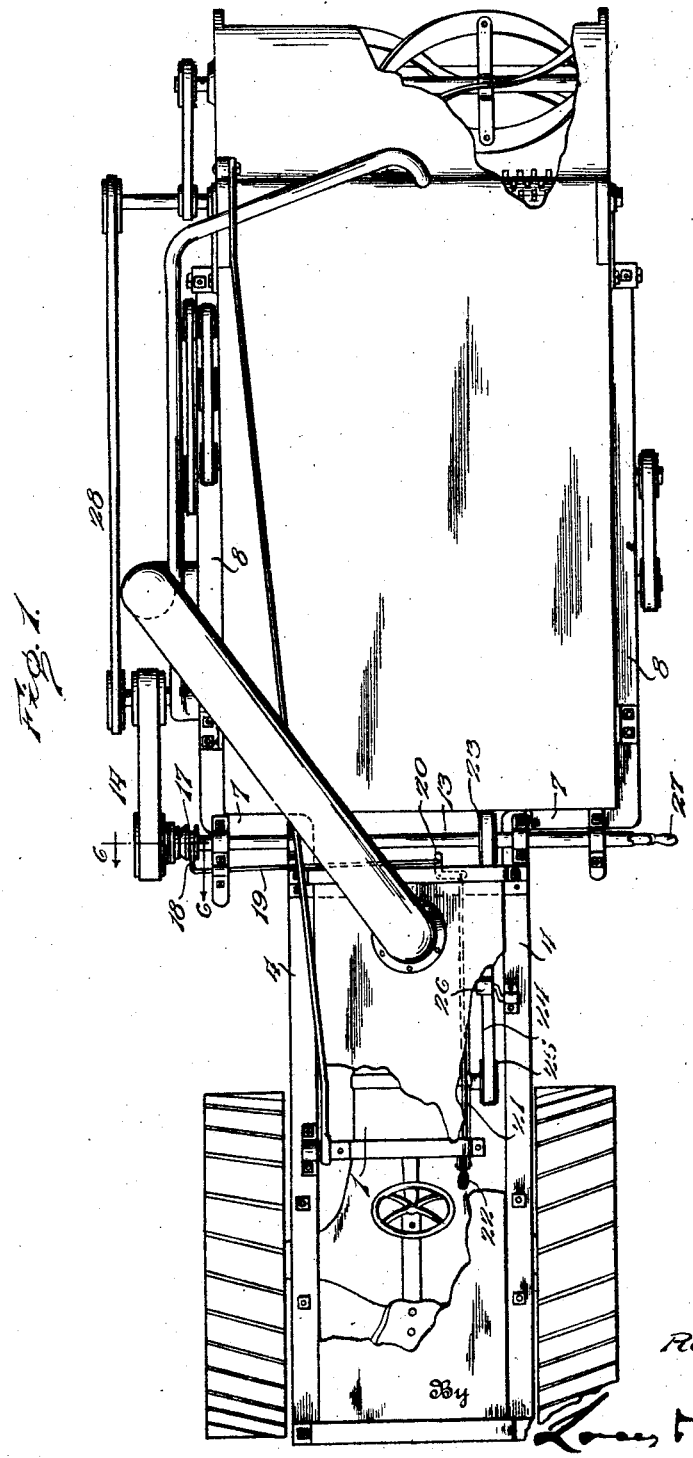
Inventor
Ross E. Curtis
By Lacey & Lacey Attorneys

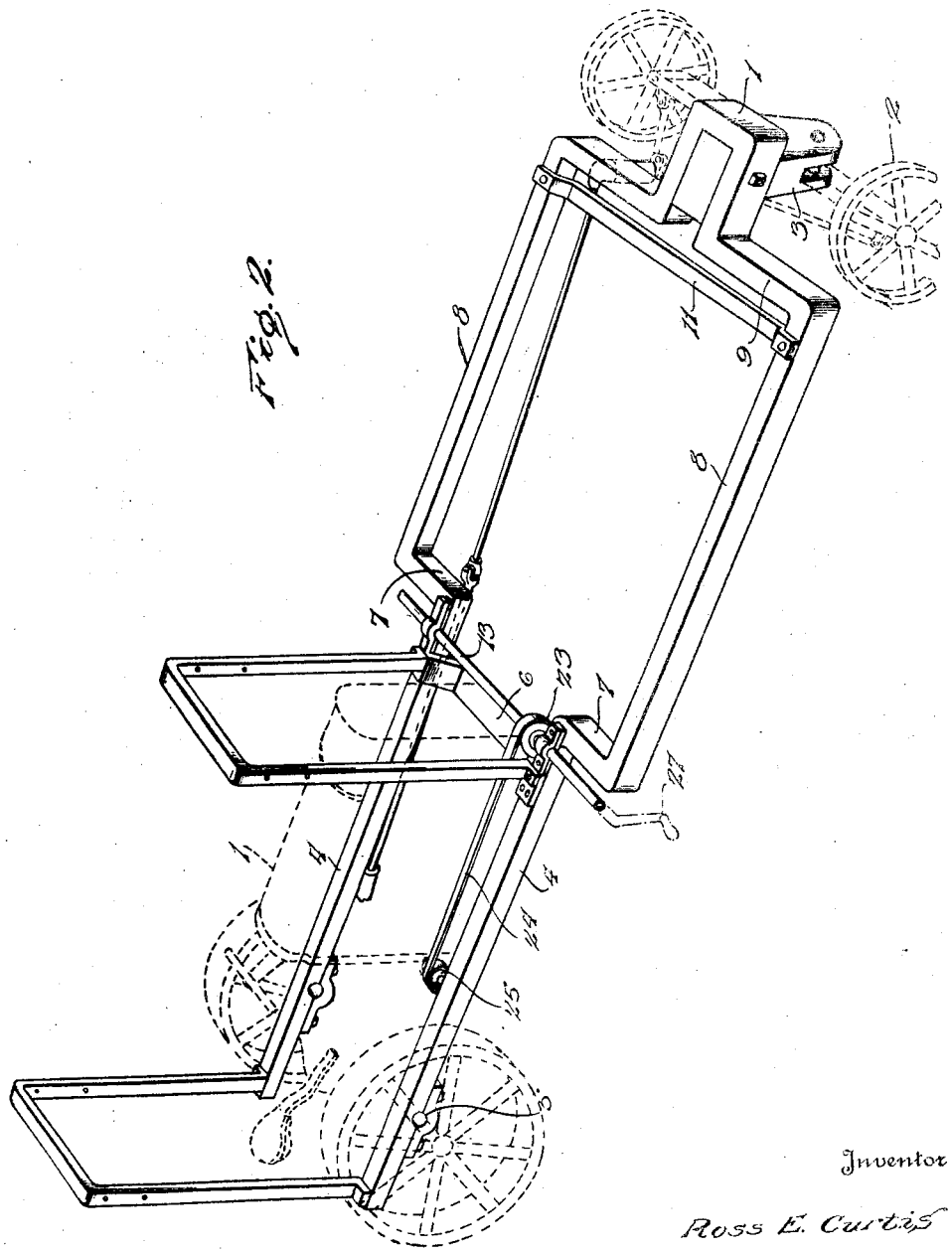

July 19, 1927.  
R. E. CURTIS  
ATTACHMENT FOR TRACTORS  
Original Filed Nov. 17, 1922
1,636,628
3 Sheets-Sheet 3
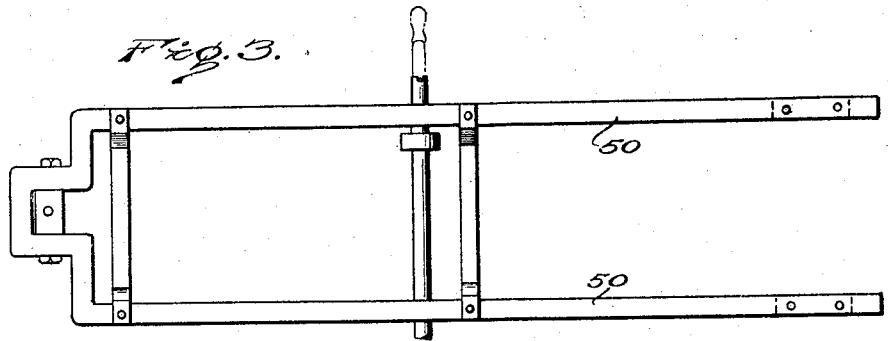
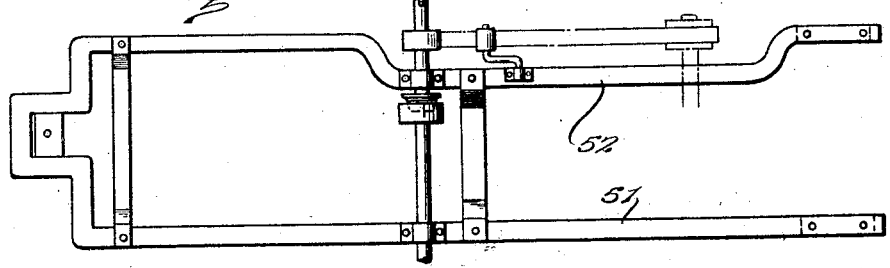
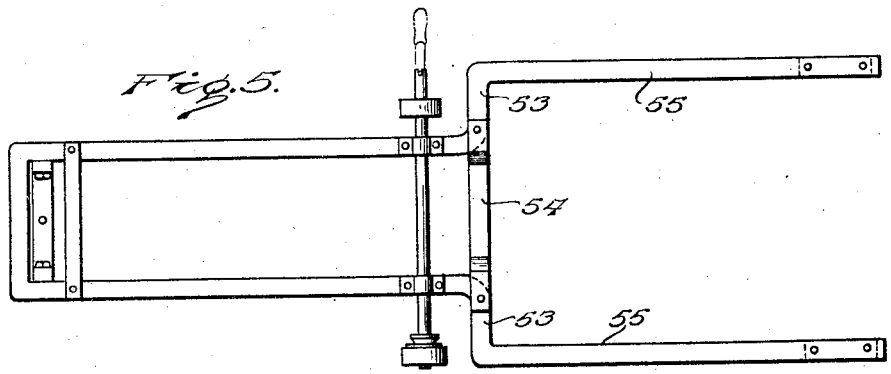
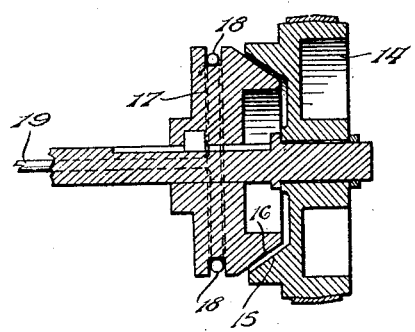
Inventor
Ross E. Curtis
By Lacy & Lacy, Attorneys Patented July 19, 1927.

1,636,628

UNITED STATES PATENT OFFICE.

ROSS E. CURTIS, OF LINCOLN, KANSAS.

ATTACHMENT FOR TRACTORS.

Original application filed November 17, 1922, Serial No. 601,561. Divided and this application filed March 9, 1925. Serial No. 14,210.

This application is a division of an application filed by me November 17, 1922, Serial No. 601,561, the object of the present invention being to provide means whereby the wheel base of any ordinary tractor may be increased, and work-performing mechanism supported in front of the tractor to be driven by the power of the same.

In the annexed drawings:

Figure 1 is a plan view, partly broken away, of one embodiment of my invention, showing a harvesting mechanism arranged to be operated by the tractor:

Fig. 2 is a perspective view showing one form of frame;

Figs. 3, 4 and 5 are plan views showing different forms of frames, and

Fig. 6 is a detail section on the line 6—6 of Fig. 1.

The tractor is indicated conventionally at 1 and may be of any well-known type. In carrying out my invention, I remove the front steering wheels 2 and the truss 3 by which said wheels are supported and employ an extension frame consisting of side bars or sills 4 which preferably have their rear portions constructed to fit around the rear axle or the rear axle housing, as indicated at 5, and be secured thereto, although they may be secured at any desired points at the sides of the tractor. In the vertical plane of the tractor radiator, I secure upon the sills or side bars 4 a transverse truss 6 which extends under the radiator and thereby supports the same and the front end of the tractor. In the form of the invention illustrated in Figs. 1 and 2, the sills 4 are turned laterally, as shown at 7, just in advance of the truss 6 and are then carried forwardly in parallel lines, as shown at 8, their front ends being connected by a cross bar 9 having a central forwardly extending projection 10 to which the support 3 for the front axle is secured. The front axle with the steering wheels 2 is then brought into position under the extension 10 and secured thereto so as to support the front end of the extension frame in the same manner that it previously supported the front end of the tractor. Adjacent the front end of the extension frame is a cross bar or brace 11 to which the radius rods may be secured and the steering rod 12 is provided with an extension or elongation which is connected at its forward extremity with the steering wheel spindles in the usual manner whereby the apparatus may be steered as is now customary. Upon the side bars or sills 4 immediately in advance of the truss 6, I mount a countershaft 13 which is equipped with a pulley 14 to transmit power to the machinery which may be mounted upon the forward portion of the extension frame, and this pulley 14 may be located at one end of the countershaft or at the center of the same as may be most desirable under any given circumstances. The pulley 14 is loose upon the countershaft and is constructed with a clutch face 15 adapted to be engaged by the mating face 16 of a clutch sleeve 17 which is slidably mounted upon the countershaft but is constrained to rotate therewith. This clutch sleeve may be controlled by any convenient means, and in the present illustration is engaged by a fork 18 carried by one end of a transverse rod 19 suitably supported adjacent and parallel with the countershaft 13 and having one end connected to an angle lever 20 which is, in turn, connected with a link 21 extending to a lever 22 (either a pedal or a hand lever) upon the tractor adjacent the chauffeur's seat. The countershaft 13 is further equipped with a pulley 23 which is fixed thereto and around which is trained a belt 24 which is also trained around the power pulley 25 now commonly provided upon the side of the tractor. The pulley 25 is operatively connected with the transmission gearing of the tractor so as to be driven thereby from the tractor engine, and the belt 24 will obviously transmit the power to the countershaft so that it will rotate as the tractor is driven over the field. A belt tightener 26 of any convenient form is mounted upon the adjacent sill or side bar 4 to maintain the belt 24 in taut condition.

A crank 27 is provided to be removably fitted to the end of the countershaft 13 so that the machine may be readily started at the beginning of operations or after it has, for any reason, been temporarily stopped. It will be readily noted that, if the countershaft 13 be rotated by the use of the starting crank 27, the motion will be transmitted from the countershaft through the pulley 23 and belt 24 to the pulley 25 and from the pulley 25 will be imparted to the transmission of the engine so that the motor will be turned over and the engine started. When the machinery mounted upon the forward portion of the extension frame is to operate, the clutch member 17 is thrown into engagement with the pulley 14 so that the pulley will be locked to the countershaft and will rotate therewith and the motion of the said pulley 14 will be transmitted through a properly arranged system of pulleys and belts, indicated at 28, to the different parts to be driven.

The form of extension frame illustrated in Figs. 1 and 2 is especially adapted for the support of a threshing and harvesting mechanism inasmuch as it provides a wide support so that the cutter may make a wide swath, and the width of the swath will be sufficient to define a path over which the driving wheels of the tractor may travel without crushing the standing grain at the side of the swath. Of course, the mechanism may be arranged to cut a swath proportionately wider than that illustrated, but it will generally be found most desirable to have the width of the swath approximately equal to the width of a path over which the driving wheels of the tractor must travel. The form of the extension frame may be varied at will so that it may conform to various types of tractors, and in Fig. 3, I have shown a frame in which the side bars or sills 50 are parallel and without any lateral formations between their ends but otherwise are of the same construction as the side bars or sills previously described. In Fig. 4, I have shown an extension frame in which one side bar or sill 51 is free of any lateral formations, but the mating side bar or sill is constructed with an inset portion 52, the belt and pulleys by which the countershaft is connected with the driving pulley of the tractor being disposed at the outer side of the said inset portion. With some types of tractors, this form of extension frame may be preferred and will be found particularly advantageous. In Fig. 5, I have illustrated an extension frame in which the side bars or sills 55 are provided with inwardly extending lateral portions 53 intermediate their ends and a truss 54 to support the front end of the tractor is secured to and extends between these inwardly projecting offsets. The form of the frame may be varied also according to the type of machinery which is to be mounted thereon and for some work some one of the illustrated forms may be found to be better adapted than the other forms, but in all the forms of the invention there is provided an extension frame which is secured about the rear axle housing or about the rear axle and projects forwardly therefrom at the sides of the tractor to increase the wheel base of the tractor and support the front end of the same, while in advance of the tractor this extension frame is adapted to carry any desired working machinery. The invention may be readily applied to tractors of any type and will be found to be advantageous in effecting an economy of time and labor in performing any given operation.

Having thus described the invention, I claim:

1. An attachment for tractors comprising a frame having side bars to extend longitudinally of a tractor and having portions adapted to be secured at opposite sides of the tractor and portions to extend forwardly therefrom, said side bars having the portions to extend forwardly from the tractor offset transversely of their other portions and connected therewith by transversely extending portions, a counter shaft extending across said frame, bearings for said shaft carried by the first-mentioned portions of said side bars adjacent their forward ends, other bearings carried by the transversely extending portions of said side bars and projecting rearwardly therefrom and engaged with said shaft, means for transmitting rotary motion to said shaft from a tractor, and means for transmitting rotary motion from said shaft to apparatus to be driven therefrom.

2. An attachment for tractors comprising a frame having side bars to extend longitudinally of a tractor and having portions adapted to be secured at opposite sides of the tractor and portions to extend forwardly therefrom, said side bars having the portions to extend forwardly from the tractor offset transversely of their other portions and connected therewith by transversely extending portions, a counter shaft extending across said frame, bearings for said shaft carried by the first-mentioned portions of said side bars adjacent their forward ends, other bearings carried by the transversely extending portions of said side bars and projecting rearwardly therefrom and engaged with said shaft, means for transmitting rotary motion to said shaft from a tractor, a pulley loose upon said shaft, a clutch slidable upon said shaft and adapted for gripping engagement with said pulley, and actuating means for said clutch including a rod extending transversely across said frame and slidably engaged with one of the last-mentioned bearings.

In testimony whereof I affix my signature.

ROSS E. CURTIS. [L. S.]